(12) United States Patent
Chander et al.

(10) Patent No.: US 7,304,977 B2
(45) Date of Patent: Dec. 4, 2007

(54) IMPLEMENTATION FOR A 5 SAMPLE GUARD INTERVAL FOR MULTI-BAND OFDM

(75) Inventors: Navin S. Chander, Plano, TX (US); Srinadh Madhavapeddi, Dallas, TX (US); Mitsuru Shimada, Richardson, TX (US); Srinivas Lingam, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 475 days.

(21) Appl. No.: 11/035,508

(22) Filed: Jan. 14, 2005

(65) Prior Publication Data

US 2005/0180376 A1    Aug. 18, 2005

Related U.S. Application Data

(60) Provisional application No. 60/545,631, filed on Feb. 17, 2004.

(51) Int. Cl.
- *H04B 7/208* (2006.01)
- *H04B 7/00* (2006.01)
- *H04Q 7/00* (2006.01)
- *H04J 15/00* (2006.01)
- *H04J 3/00* (2006.01)
- *H04J 1/00* (2006.01)

(52) U.S. Cl. .............. 370/344; 370/310; 370/328; 370/464; 370/476; 370/480

(58) Field of Classification Search ........ 370/208, 370/310, 344, 480, 528; 375/140, 240.21
See application file for complete search history.

(56) References Cited

U.S. PATENT DOCUMENTS

| | | | |
|---|---|---|---|
| 6,188,703 B1 * | 2/2001 | Dobson et al. | 370/537 |
| 6,222,875 B1 | 4/2001 | Dahlman et al. | |
| 6,370,130 B1 | 4/2002 | Zhou et al. | |
| 6,597,676 B1 | 7/2003 | Ariyoshi et al. | |
| 6,693,890 B1 | 2/2004 | Yick et al. | |
| 6,888,840 B1 * | 5/2005 | Ramaswamy et al. | 370/412 |
| 6,982,991 B1 * | 1/2006 | Atoji | 370/474 |
| 2002/0034215 A1 | 3/2002 | Inoue et al. | |
| 2003/0072255 A1 | 4/2003 | Ma et al. | |
| 2004/0052306 A1 | 3/2004 | Ibrahim et al. | |
| 2004/0066802 A1 * | 4/2004 | Ro et al. | 370/528 |
| 2004/0109405 A1 * | 6/2004 | Suh et al. | 370/208 |
| 2004/0120413 A1 * | 6/2004 | Park et al. | 375/260 |
| 2004/0160987 A1 * | 8/2004 | Sudo et al. | 370/480 |
| 2004/0240527 A1 | 12/2004 | Giannakis et al. | |
| 2005/0068932 A1 | 3/2005 | Lakkis | |
| 2005/0180376 A1 | 8/2005 | Chander et al. | |

(Continued)

FOREIGN PATENT DOCUMENTS

JP    2000278238 A  * 10/2000

* cited by examiner

*Primary Examiner*—Lester G. Kincaid
*Assistant Examiner*—Nathan Mitchell
(74) *Attorney, Agent, or Firm*—Steven A. Shaw; W. James Brady; Frederick J. Telecky, Jr.

(57) ABSTRACT

A sequence of data samples and a sequence of non-data samples are provided. Four input samples from one of the data samples and the non-data samples are selected based on a clock signal. At least a portion of contents of a first group of memory cells are stored in a second group of memory cells. The first group of memory cells are comprised of four memory cells. The selected four input samples are stored in the first group of memory cells.

19 Claims, 3 Drawing Sheets

IMPLEMENTATION FOR A 5 SAMPLE GUARD INTERVAL FOR MULTI-BAND OFDM

CROSS-REFERENCE TO RELATED APPLICATIONS

This application claims priority to U.S. Provisional Application No. 60/545,631 filed Feb. 17, 2004, and entitled "Implementation for a 5 Sample Guard Interval for Multi-band OFDM," by Navin S. Chander et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a system and method for generating a 165 sample length orthogonal frequency division multiplex symbol for an ultra wideband system based on the Multi-band Orthogonal Frequency Division Multiplex system specification.

BACKGROUND OF THE INVENTION

A wireless network provides for wireless communication among members of the wireless network. Wireless local area networks (WLANs) with ranges of about 100 meters or so have become increasingly popular. Wireless local area networks may employ sophisticated protocols to promote communications. Wireless personal area networks with ranges of about 10 meters are poised for growth, and continued engineering development effort is committed to developing protocols supporting wireless personal area networks.

With limited range, wireless personal area networks may have fewer members and require less power than wireless local area networks. The IEEE (Institute of Electrical and Electronics Engineers) is developing the IEEE 802.15.3a wireless personal area network standard. The multi-band orthogonal frequency division multiplex (MB-OFDM) system is one possible implementation of the 802.15.3a high data rate physical layer specification. The term piconet refers to a wireless personal area network having an ad hoc topology comprising communicating devices coordinated by a piconet coordinator (PNC). Piconets may form, reform, and abate spontaneously as various wireless devices enter and leave each other's proximity. Piconets may be characterized by their limited temporal and spatial extent. Physically adjacent wireless devices may group themselves into multiple piconets running simultaneously.

The MB-OFDM wireless personal area network standard divides an approximately 7.5 GHz bandwidth from about 3.1 GHz to 10.6 GHz into fourteen approximately 528 MHz wide bands. These fourteen bands are organized into four band groups of three 528 MHz bands each and one band group of two 528 MHz bands. The IEEE 802.15.3a version of this standard is directed to high data rate communications, including transmission rates of 55 mbps to 480 mbps. A piconet may transmit a first orthogonal frequency division multiplex (OFDM) symbol in a first 312.5 nS duration time interval in a first frequency band of a band group, a second OFDM symbol in a second 312.5 nS duration time interval in a second frequency band of the band group, and a third OFDM symbol in a third 312.5 nS duration time interval in a third frequency band of the band group. Other piconets may also transmit concurrently using the same band group, discriminating themselves by using a distinguishing preamble sequence. This method of piconets sharing a band group by transmitting on each of the three 528 MHz wide frequencies of the band group may be referred to as time frequency coding or time frequency interleaving (TFI). Alternately, piconets may transmit exclusively on one frequency band of the band group which may be referred to as fixed frequency interleaving (FFI).

SUMMARY OF THE INVENTION

According to one embodiment, a circuit for assembling an orthogonal frequency division multiplex symbol is provided. The circuit includes a first multiplexer operable to select four of eight inputs to route samples present on the eight inputs to four outputs based on clock input from a first clock. The circuit includes a first group of four memory cells coupled to receive the samples from the four outputs of the first multiplexer and output the samples on an edge of clock input of the first clock. The circuit a second group of memory cells coupled to receive at least a portion of the samples from the four outputs of the first group of memory cells on an edge of clock input of the first clock. The circuit also includes a second multiplexer operable to select four of sixteen inputs to route samples present on the sixteen inputs to four outputs based on a clock input from the first clock to form orthogonal frequency division multiplex symbols.

In one embodiment, the present disclosure provides a method for processing four samples per clock period of an orthogonal frequency division multiplex symbol having a length not a multiple of four. The Method includes providing a sequence of data samples and a sequence of non-data samples. The method includes selecting four input samples from one of the data samples and the non-data samples based on a clock signal. The method includes storing at least a portion of contents of a first group of memory cells in a second group of memory cells. The first group of memory cells comprised of four memory cells. The method also provides for storing the selected four input samples in the first group of memory cells.

In another embodiment, the present disclosure provides a system for constructing an orthogonal frequency division multiplex symbol. The system includes a first clock, a first two-to-one multiplexer, a first and second group of memory cells, and a four-to-one multiplexer. The first two-to-one multiplexer has four outputs, a first group of four inputs, a second group of four inputs, and an input based on the first clock. The first two-to-one multiplexer is operable to select one of the first and second group of four inputs to connect to the four outputs of the first two-to-one multiplexer. The selection is based on the input based on the first clock. The first group of four memory cells having four inputs coupled to the four outputs of the first two-to-one multiplexer. The first group of four memory cells also having an input from the first clock and four outputs. The first group of memory cells stores a first set of four sample values received on the four inputs of the first group of memory cells. The second group of memory cells has inputs coupled to at least some of the four outputs of the first group of memory cells. The second group of memory cells has an input from the first clock and is operable to store a second set of sample values received on the inputs of the second group of four memory cells. The four-to-one multiplexer has four outputs and four groups of four inputs, a first, second, third, and fourth group of four inputs. The first group of four inputs is coupled to four of the first and second group of memory cells. The second group of four inputs is coupled to another four of the first and second group of memory cells. The third group of four inputs is coupled to another four of the first and second group of memory cells. The fourth group of four inputs is coupled to another four of the first and second group of memory cells. The four-to-one multiplexer has an input based on the first clock and is operable to select one of the first, second, third, and fourth group of four inputs to connect to the four outputs of the four-to-one multiplexer, the selection being based on the input of the clock.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
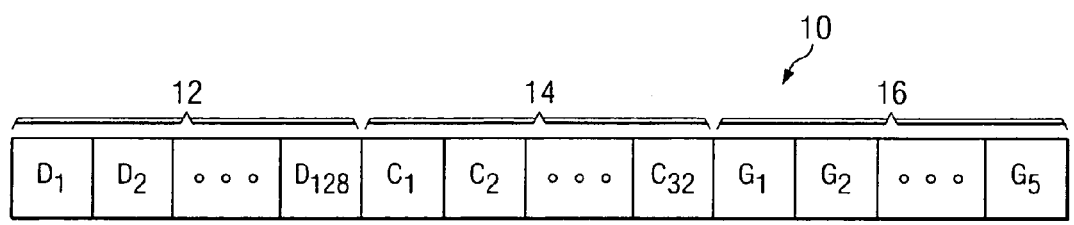
FIG. 1 illustrates a 165 sample orthogonal frequency division multiplex symbol.

Turning to FIG. 1, an OFDM symbol 10 is depicted. The OFDM symbol 10 may comprise 165 samples including 128 data samples 12, 32 cyclic prefix samples 14, and 5 guard samples 16. The cyclic prefix samples 14 may also be referred to as zero prefix samples. The data samples 12 contain the principle information content of the OFDM symbol 10. The cyclic prefix samples 14 and the guard samples 16 are provided to promote reliable communications. The cyclic prefix samples 14 may support an OFDM symbol structure, and the guard samples 16 may support time frequency interleaving (TFI) of fixed frequency interleaving (FFI) of the MB-OFDM system. The samples are digital numbers comprising from 4 bits to 8 bits. In other embodiments, a different number of bits may be employed to compose the samples.

Figure 2:
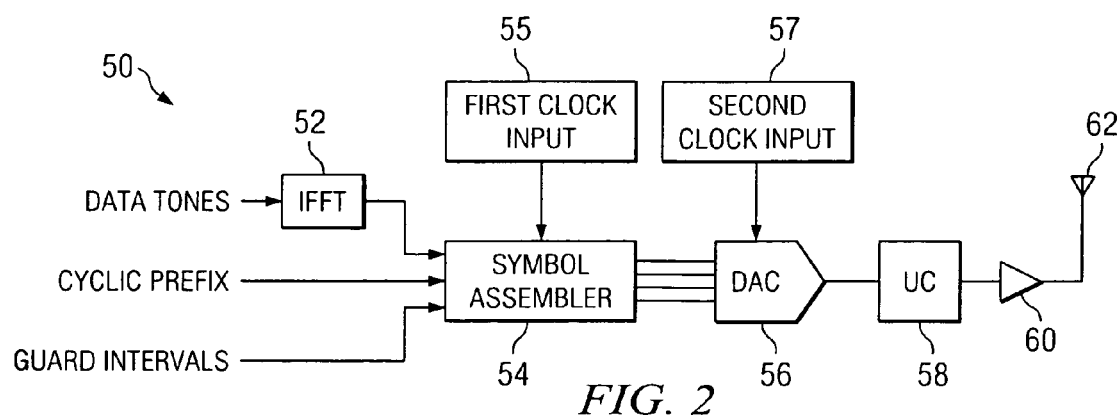
FIG. 2 illustrates a portion of a transmitter circuit according to one embodiment of the present disclosure.

Turning to FIG. 2, a portion of a wireless personal area network transmitter 50 is depicted. Data tones are input to an inverse fast Fourier transform component 52 which transforms the data tones from the frequency domain to the time domain as a sequence of the data samples 12. The sequence of data samples 12 are input to a symbol assembler 54. The cyclic prefix samples 14 and the guard interval samples 16 are also input to the symbol assembler 54. The symbol assembler 54 assembles the data samples 12, the cyclic prefix samples 14, and the guard interval samples 16 into a sequence of four samples which are output to a digital-to-analog converter 56. The symbol assembler 54 receives a first clock input 55 which the symbol assembler 54 uses to output the four samples to the digital-to-analog converter 56. In an embodiment, the first clock input 55 is a 132 MHz clock input.

The digital-to-analog converter 56 receives a second clock input 57 which may be four times the frequency of the first clock input 55, which the digital-to-analog converter 56 uses to output one sample of the four samples received from the symbol assembler 54, to serialize the OFDM symbol 10. By outputting each sample, the digital-to-analog converter 56 generates a stream of samples that may be referred to as a baseband signal. In an embodiment, the second clock input 57 is a 528 MHz clock input.

The digital-to-analog converter 56 outputs the baseband signal to an up converter 58 which frequency shifts the baseband signal to a higher frequency suitable for transmission. The up converter 58 outputs the up converted signal to an amplifier 60 which boosts the amplitude of the up converted signal to promote radio transmission and sends the amplified up converted signal to an antenna 62. The antenna 62 transmits the amplified up converted signal as electromagnetic energy.

Figure 3A:
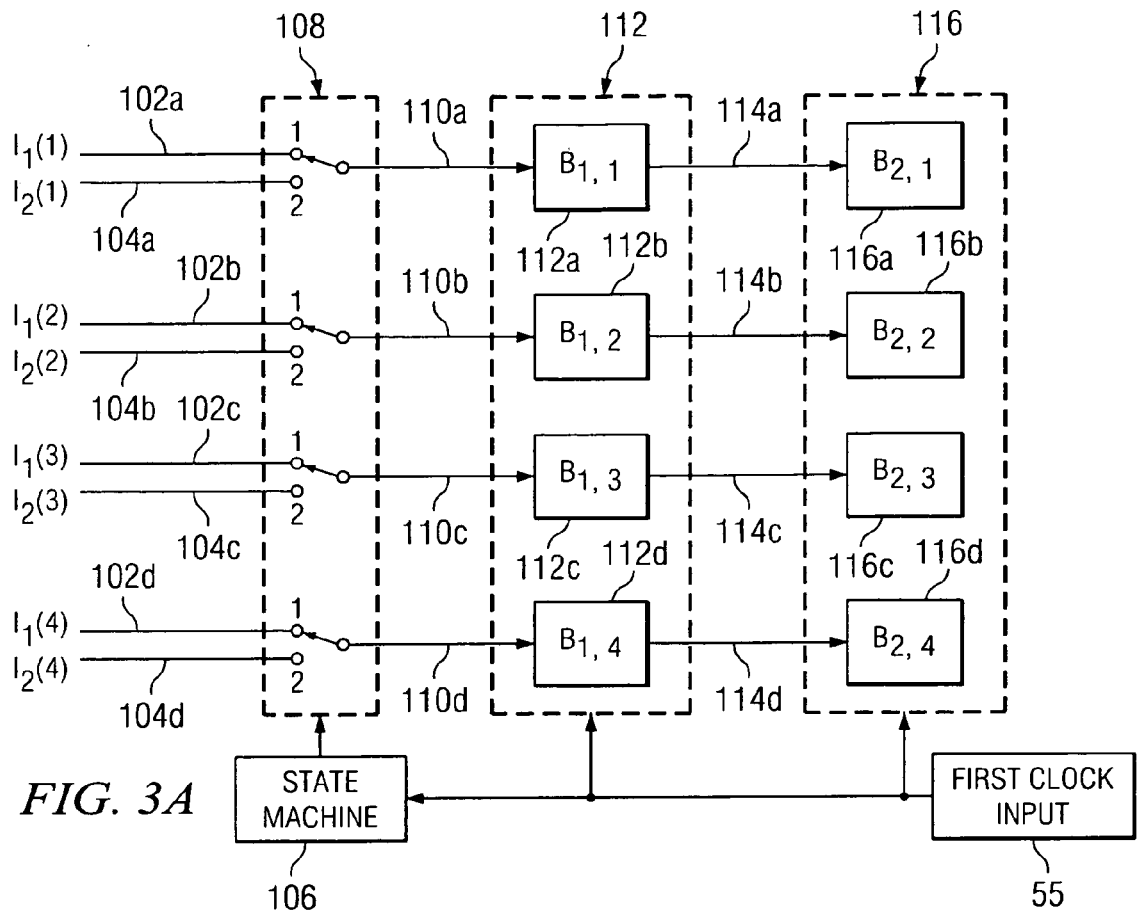
FIG. 3A is a block diagram of a first portion of a symbol assembler for an embodiment of the present disclosure.

Turning now to FIG. 3A, a block diagram depicts one embodiment of a first portion of the processing provided by the symbol assembler 54. The four data sample inputs from the inverse fast Fourier transformer 52 are shown as data sample inputs $I_1$ 102—a first data sample input $I_1(1)$ 102a, a second data sample input $I_1(2)$ 102b, a third data sample input $I_1(3)$ 102c, and a fourth data sample input $I_1(4)$ 102d. In the present embodiment, the cyclic prefix samples 14 and the guard interval samples 16 are always zero values. The guard interval samples are zero valued to promote frequency discrimination between adjacent frequency bands. When not otherwise employed for receiving the OFDM symbol, assigning zero values to the cyclic prefix samples further promotes frequency discrimination between adjacent frequency bands. Four zero valued sample inputs are shown as zero sample inputs $I_2$ 104—a first zero sample input $I_2(1)$ 104a, a second zero sample input $I_2(2)$ 104b, a third zero sample input $I_2(3)$ 104c, and a fourth zero sample input $I_2(4)$ 104d.

The first clock input 55 is provided to a first state machine component 106. The first state machine 106 controls a first multiplexer 108, a two-to-one multiplexer, based on the first clock input 55. In a first position, the first multiplexer 108 provides the data sample inputs $I_1$ 102 to a respective first memory cell bank 112 via inputs 110. In a second position, the first multiplexer 108 provides the zero sample inputs $I_2$ 104 to the respective first memory cell bank 112 via inputs 110. In the one embodiment, the first clock input 55 is processed by the first state machine 106 to produce a first mux count which counts the first clock input 55 modulo 165. Thus, the first mux count increments on each clock period of the first clock input 55 from 0 to 164, and then back to 0 on the first clock period of the first clock input 55 after counting 164. The first state machine 106 may control the first multiplexer 108 to select between the data sample inputs $I_1$ 102 and the zero sample inputs $I_2$ 104 according to the following table.

| Select $I_1$ position | 0 mux count | 41 mux count | 82 mux count | 123 mux count |
|---|---|---|---|---|
| Select $I_2$ position | 32 mux count | 73 mux count | 114 mux count | 155 mux count |

For first mux count values not identified in the table, the first multiplexer 108 remains in the previously selected position.

Figure 3B:
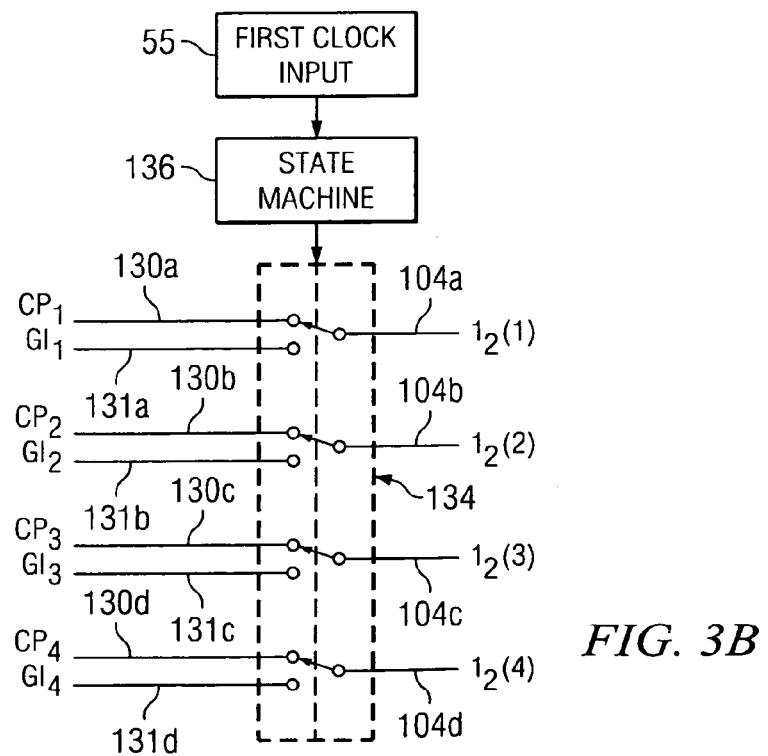
FIG. 3B is a block diagram of a cyclic prefix/guard interval two-to-one multiplexer for an embodiment of the present disclosure.

In other embodiments, some of the cyclic prefix samples 14 may be non-zero valued. Turning now to FIG. 3B, a second multiplexer 134, also a two-to-one multiplexer, is shown. The second multiplexer 134 is upstream of the first multiplexer 108 and provides the inputs 104 to the first multiplexer 108. The second multiplexer 134 is coupled to the four inputs $I_2$ 104 depicted in FIG. 3A above. Cyclic prefix inputs 130 provide cyclic prefix samples and guard interval inputs 131 provide guard interval samples to the second multiplexer 134. A second state machine 136 controls the second multiplexer 134 based on the first clock input 55. In a first position, the second multiplexer 134 selects cyclic prefix values to provide to the four inputs $I_2$ 104. In a second position, the second multiplexer 134 selects the guard interval input 131 samples to provide to the four inputs 12 104. The guard interval samples are all zero valued. The first clock input 55 may be processed by the second state machine 136 to produce a second mux count which counts the first clock input 55 modulo 165. The second mux count increments on each clock period of the first clock input 55 from 0 to 164, and then back to 0 on the first clock period of the first clock input 55 after counting 164. The second mux count is always in agreement with the first mux count described above. In an embodiment, the second state machine 136 is omitted and the first mux count is distributed to both the first multiplexer 108 and the second multiplexer 134. The second state machine 136 may control the second multiplexer 134 to select between the cyclic prefix inputs 130 and the guard interval inputs 131 according to the following table.

| Select Cyclic Prefix | 32 mux count | 73 mux count | 114 mux count | 155 mux count |
|---|---|---|---|---|
| Select Guard Interval | 40 mux count | 81 mux count | 122 mux count | 163 mux count |

For second mux count values not identified in the table, the second multiplexer 134 remains in the previously selected position. In an embodiment in which the cyclic prefix samples on the cyclic prefix inputs 130 are all zero valued, the second multiplexer 134 is not implemented.

Turning back to FIG. 3A, the first memory cell bank 112 comprises four individual memory cells—a first memory cell 112a having an input 110a, a second memory cell 112b having an input 110b, a third memory cell 112c having an input 110c, and a fourth memory cell 112d having an input 110d. The first memory cell bank 112 receives the first clock input and stores the value of the inputs 110 on the clock period. After the value of the inputs 110 have been stored by the first memory cell bank 112, the first memory cell bank 112 outputs these values to the inputs 114 of a second memory cell bank 116. The second memory cell bank 116 comprises four individual memory cells—a fifth memory cell 116a having an input 114a, a sixth memory cell 116b having an input 114b, a seventh memory cell 116c having an input 114c, and an eighth memory cell 116d having an input 114d. In an embodiment, the fifth memory cell 116a is never read from, the input 114a may be omitted, and the fifth memory cell 116a may be omitted from the second memory cell bank 116. The second memory cell bank 116 receives the first clock input and stores the value of the inputs 114 on the clock period. The first memory cell bank 112 and the second memory cell bank 116 form a sequence such that the contents of the second memory cell bank 116 during a particular clock period is the contents that the first memory cell bank 112 held during the previous clock period.

Figure 4:
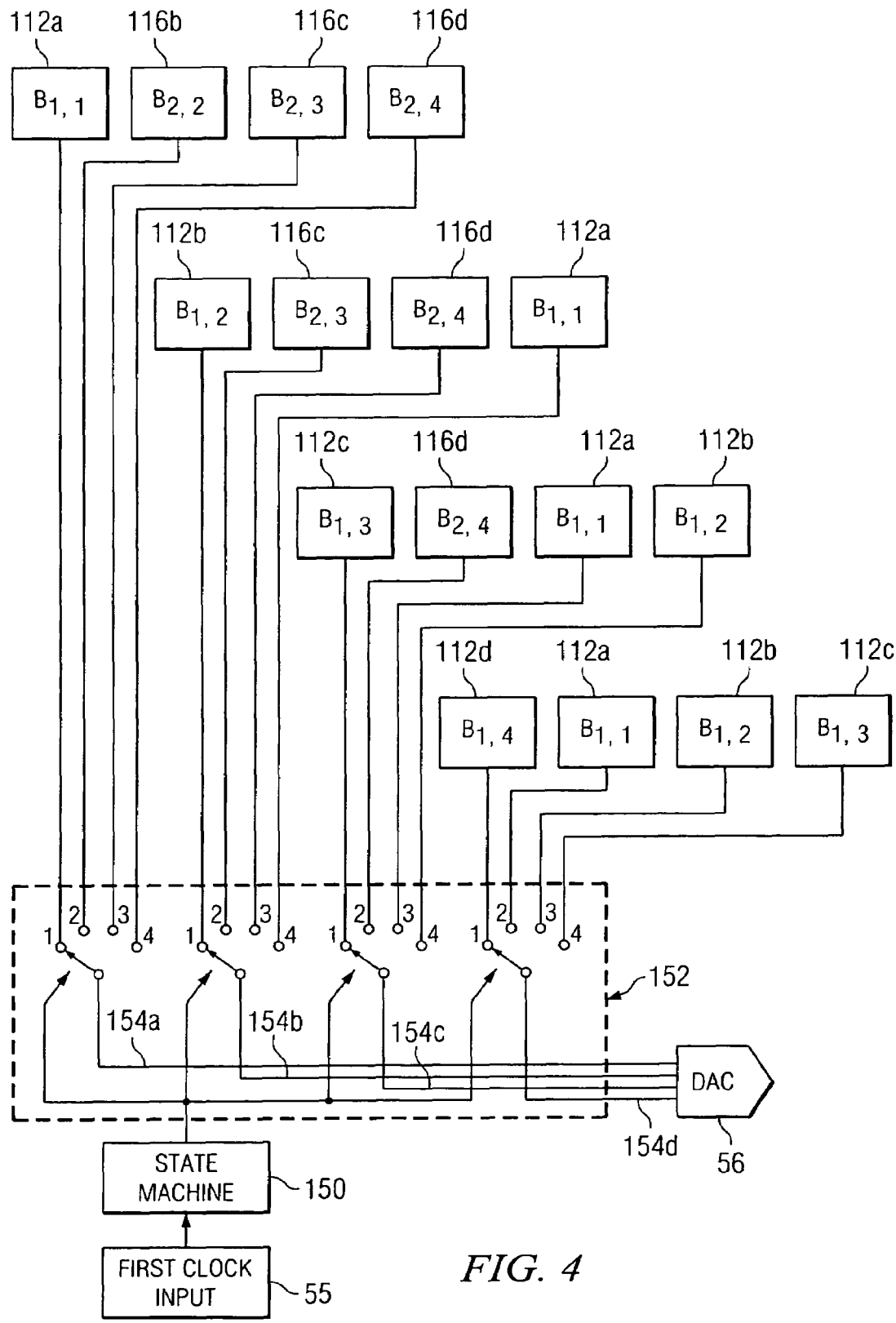
FIG. 4 is a block diagram of a second portion of a symbol assembler for an embodiment of the present disclosure.

Turning now to FIG. 4, a block diagram depicts a second portion of the processing provided by the symbol assembler 54. The first clock input 55 is presented to a third state machine 150. The third state machine 150 controls a third multiplexer 152, a four-to-one multiplexer, based on the first clock input 55. In a first position of the third multiplexer 152, the content of the first memory cell 112a is routed to an input 154a of the digital-to-analog converter 56 and the content of the second memory cell 112b is routed to an input 154b of the digital-to-analog converter 56. Also in the first position, the content of the third memory cell 112c is routed to an input 154c of the digital-to-analog converter 56 and the content of the fourth memory cell 112d is routed to an input 154d of the digital-to-analog converter 56. In a second position of the third multiplexer 152, the contents of the sixth memory cell 116b, the seventh memory cell 116c, the eighth memory cell 116d, and the first memory cell 112a are routed to the inputs 154a, 154b, 154c, and 154d respectively of the digital-to-analog converter 56. In a third position of the third multiplexer 152, the contents of the seventh memory cell 116c, the eighth memory cell 116d, the first memory cell 112a, and the second memory cell 112b are routed to the inputs 154a, 154b, 154c, and 154d respectively of the digital-to-analog converter 56. In a fourth position of the third multiplexer 152, the contents of the eighth memory cell 116d, the first memory cell 112a, the second memory cell 112b, and the third memory cell 112c are routed to the inputs 154a, 154b, 154c, and 154d respectively of the digital-to-analog converter 56.

In the preferred embodiment, the first clock input 55 is processed by the third state machine 150 to produce a third mux count which counts the first clock input 55 modulo 165. This third mux count is the same as the first mux count developed by the first multiplexer 108. The counts of the third mux count and the first mux count are always in agreement. In an embodiment, a mux count may be developed from the first clock input 55 by a mux clock component (not shown) and distributed to both the first multiplexer 108 and the third multiplexer 152 in lieu of the first multiplexer 108 developing the first mux count and the third multiplexer 152 developing the third mux count. The third state machine 150 may control the third multiplexer to select the positions of the four-to-one multiplexer according to the following table.

| Select position 1 | 0 mux count |
|---|---|
| Select position 4 | 41 mux count |
| Select position 3 | 82 mux count |
| Select position 2 | 123 mux count |

For third mux count values not identified in the table, the third multiplexer 152 remains in the previously selected position.

The above described processing provided by the symbol assembler 54 produces the desired 165 sample symbol. The approach for building the 165 sample symbols using the symbol assembler 54 can be readily extended to the case where some of the cyclic prefix samples 14 are non-zero. The symbol assembler 54 may be implemented in an application specific integrated circuit (ASIC) with circuit components such as gates and traces. Additionally, the IFFT 52, the symbol assembler 54, the digital-to-analog converter 56, the up converter 58, and the amplifier 60 may be implemented in a single ASIC. Note that while the first multiplexer 108, the second multiplexer 134, and the third multiplexer 152 are represented as electrical switches in FIG. 3 and FIG. 4 above, these multiplexers may be implemented as semiconductor circuit elements. Also note that components may be separated or combined in a single application specific integrated circuit, for example the inverse fast Fourier transform component 52 and other transmitter components may be combined with the symbol assembler component 54 in a single application specific integrated circuit.

The embodiments described above are directed to 4M+1 sample length symbol systems, where M is an integer and the number of data samples 12 and the number of cyclic prefix samples 14 being multiples of 4. With very minor modification to the control rules of the state machines, the above embodiment may be revised to accommodate alternate 4M+1 sample symbols systems with the number of data samples 12 and the number of cyclic prefix samples 14 being multiples of 4, for example 161 or 169 sample symbols systems. Additionally, the embodiments described above could also be extended, by similar revisions to the control rules of the multiplexer state machines, to accommodate 4M+2 and 4M+3 sample symbol systems with the number of data samples 12 and the number of cyclic prefix samples 14 being multiples of 4. The modifications of the control rules of the multiplexer state machines needed to accommodate these alternate 4M+1, 4M+2, and 4M+3 systems can be readily determined by one of ordinary skill in the art.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for processing four samples per clock period of an orthogonal frequency division multiplex symbol having a length not a multiple of four, comprising:
   providing a sequence of data samples;
   providing a sequence of non-data samples;
   selecting four input samples from one of the data samples and the non-data samples based on a clock signal;
   storing at least a portion of contents of a first group of memory cells in a second group of memory cells, the first group of memory cells comprised of four memory cells; and
   storing the selected four input samples in the first group of memory cells.

2. The method of claim 1, further including incrementing a count every period of the clock signal from 0 to 164 and resetting the count to 0 on the next period of the clock signal when the count is 164.

3. The method of claim 2, wherein the four input samples are selected from the data samples on count 0 through 31, 41 through 72, 82 through 113, and 123 through 154 and the four input samples are selected from the non-data samples on count 32 through 40, 73 through 81, 114 through 122, and 155 through 164.

4. The method of claim 2, wherein the non-data samples include a sequence of cyclic prefix samples and a sequence of zero valued samples and further including:
   selecting four samples from the sequence of cyclic prefix samples for providing as the non-data samples on the count 32 to 39, count 73 to 80, count 114 to 121, and 155 to 162; and
   selecting four samples from the sequence of zero valued samples for providing as the non-data samples on the count 40, count 81, count 122, count 163, and count 164.

5. The method of claim 2, further including:
   selecting a first group of four samples from the samples stored in the first and second group of memory cells on count 0 through 40;
   thereafter outputting the first group of four samples;
   selecting a second group of four samples from the samples stored in the first and second group of memory cells on count 41 through 81;
   thereafter outputting the second group of four samples;
   selecting a third group of four samples from the samples stored in the first and second group of memory cells on count 82 through 122;
   thereafter outputting the third group of four samples;
   selecting a fourth group of four samples from the samples stored in the first and second group of memory cells on count 123 through 164;
   thereafter outputting the fourth group of four samples.

6. The method of claim 4, wherein outputting involves providing the four samples to a digital-to-analog converter to serialize the four samples and output each of the four samples as analog values.

7. The method of claim 1, wherein the second group of memory cells comprises four memory cells and stores the contents of four of the first group of memory cells.

8. The method of claim 1, wherein
   the first group of memory cells comprises a first memory cell, a second memory cell, a third memory cell, and a fourth memory cell; and
   the second group of memory cells comprises three memory cells including a fifth memory cell storing the content of the second memory cell, a sixth memory cell storing the content of the third memory cell, and a seventh memory cell storing the content of the fourth memory cell.

9. A circuit for assembling an orthogonal frequency division multiplex symbol, comprising:
a first multiplexer operable to select four of eight inputs to route samples present on the eight inputs to four outputs based on clock input from a first clock;
a first group of four memory cells coupled to receive the samples from the four outputs of the first multiplexer and output the samples on an edge of clock input of the first clock;
a second group of memory cells coupled to receive at least a portion of the samples from the four outputs of the first group of memory cells on an edge of clock input of the first clock; and
a second multiplexer operable to select four of sixteen inputs to route samples present on the sixteen inputs to four outputs based on a clock input from the first clock to form orthogonal frequency division multiplex symbols.

10. The circuit of claim 9, wherein the orthogonal frequency division multiplex symbols are 165 samples long.

11. The circuit of claim 9, wherein a first four of the eight inputs to the first multiplexer provide data samples to the first multiplexer and a second four of the eight inputs to the first multiplexer provide non-data samples to the first multiplexer.

12. The circuit of claim 11, wherein the first multiplexer selects the data samples to route to the four outputs of the first multiplexer when a first modulo 165 count based on the first clock count is 0 to 31, 41 to 72, 82 to 113, and 123 to 154 and selects the non-data samples to route to the four outputs of the first multiplexer when the first modulo 165 count based on the first clock count is 32 to 40, 73 to 81, 114 to 122, and 155 to 164.

13. The circuit of claim 2, further including a third multiplexer operable to select four of eight inputs to route samples present on the selected four eight inputs to four outputs of the third multiplexer based on clock input from the first clock, the four outputs of the third multiplexer coupled to the second four of the eight inputs to the first multiplexer, wherein a first group of four inputs to the third multiplexer provide cyclic prefix samples and a second group of four of inputs to the third multiplexer provide zero valued samples.

14. The circuit of claim 13, wherein the third multiplexer selects the first group of four inputs to the third multiplexer to be routed to the four outputs of the third multiplexer when a third modulo 165 count based on the first clock is 32 to 39, 73 to 80, 114 to 121, and 155 to 162, and the third multiplexer selects the second group of four inputs to the third multiplexer to be routed to the four outputs of the third multiplexer when the third modulo 165 count is 40, 81, 122, 163, and 164, the third modulo 165 count always in agreement with the first modulo 165 count.

15. A system for constructing an orthogonal frequency division multiplex symbol, comprising:
a first clock;
a first two-to-one multiplexer having four outputs, a first group of four inputs, a second group of four inputs, and an input based on the first clock, the first two-to-one multiplexer operable to select one of the first and second group of four inputs to connect to the four outputs of the first two-to-one multiplexer, the selection based on the input based on the first clock;
a first group of four memory cells having four inputs coupled to the four outputs of the first two-to-one multiplexer, an input from the first clock, and four outputs, the first group of memory cells operable to store a first set of four sample values received on the four inputs of the first group of memory cells;
a second group of memory cells having inputs coupled to at least some of the four outputs of the first group of memory cells, the second group of memory cells having an input from the first clock and operable to store a second set of sample values received on the inputs of the second group of four memory cells; and
a four-to-one multiplexer having an input based on the first clock, four outputs and four groups of four inputs defined as a first, second, third, and fourth group of four inputs, the first group of four inputs coupled to four of the first and second group of memory cells, the second group of four inputs coupled to another four of the first and second group of memory cells, the third group of four inputs coupled to another four of the first and second group of memory cells, the fourth group of four inputs coupled to another four of the first and second group of memory cells, the four-to-one multiplexer operable to select one of the first, second, third, and fourth group of four inputs to connect to the four outputs of the four-to-one multiplexer based on the input of the clock.

16. The system of claim 15, wherein the first group of four inputs of the first two-to-one multiplexer receive data samples and the second group of four inputs of the first two-to-one multiplexer receive zero valued samples.

17. The system of claim 15, wherein the first two-to-one multiplexer selects the first group of four inputs to the first two-to-one multiplexer when a first modulo 165 count based on the first clock counts 0, 41, 82, and 123 and selects the second group of four inputs to the two-to-one multiplexer when the first modulo 165 count based on the first clock counts 32, 73,114, and 155.

18. The system of claim 15, further including:
a second two-to-one multiplexer having four outputs coupled to the second group of four inputs of the first two-to-one multiplexer, the second two-to-one multiplexer having a cyclic prefix group of four inputs to receive cyclic prefix samples and a zero value group of four inputs to receive zero valued samples, and an input based on the first clock, the second two-to-one multiplexer operable to select the cyclic prefix group of four inputs when a second modulo 165 count based on the first clock counts 32, 73, 114, and 155 and selects the zero value group of four inputs when the second modulo 165 count based on the first clock counts 40, 81, 122, and 163, the second modulo 165 count always in agreement with the first modulo 165 count.

19. The system of claim 15, wherein:
the outputs of the first two-to-one multiplexer are labeled $M_1O_1$, $M_1O_2$, $M_1O_3$, and $M_1O_4$;
the first memory cell of the first group of memory cells is labeled $B_{1,1}$, the second memory cell of the first group of memory cells is labeled $B_{1,2}$, the third memory cell of the first group of memory cells is labeled $B_{1,3}$, the fourth memory cell of the first group of memory cells is labeled $B_{1,4}$, the input of the memory cell $B_{1,1}$ is labeled $B_{1,1}I$, the output of the memory cell $B_{1,1}$ is labeled $B_{1,1}O$, the input of the memory cell $B_{1,2}$ is labeled $B_{1,2}I$, the output of the memory cell $B_{1,2}$ is labeled $B_{1,2}O$, the input of the memory cell $B_{1,3}$ is labeled $B_{1,3}I$, the output of the memory cell $B_{1,3}$ is labeled $B_{1,3}O$, the input of the memory cell $B_{1,4}$ is labeled $B_{1,4}I$, the output of the memory cell $B_{1,4}$ is labeled $B_{1,4}O$;

the first memory cell of the second group of memory cells is labeled $B_{2,2}$, the second memory cell of the second group of memory cells is labeled $B_{2,3}$, the third memory cell of the second group of memory cells is labeled $B_{2,4}$, the input of the memory cell $B_{2,2}$ is labeled $B_{2,2}I$, the input of the memory cell $B_{2,3}$ is labeled $B_{2,3}I$, and the input of the memory cell $B_{2,4}$ is labeled $B_{2,4}I$;

$M_1O_1$ is coupled to $B_{1,1}I$, $M_1O_2$ is coupled to $B_{1,2}I$, $M_1O_3$ is coupled to $B_{1,3}$, and $M_1O_4$ is coupled to $B_{1,4}I$;

$B_{1,2}O$ is coupled to $B_{2,2}I$, $B_{1,3}O$ is coupled to $B_{2,3}I$, and $B_{1,4}O$ is coupled to $B_{2,4}I$;

the outputs of the four-to-one multiplexer are labeled $M_2O_1$, $M_2O_2$, $M_2O_3$, and $M_2O_4$;

the first group of inputs to the four-to-one multiplexer are labeled $M_2G_1I_1$, $M_2G_1I_2$, $M_2G_1I_3$, and $M_2G_1I_4$, the second group of inputs to the four-to-one multiplexer are labeled $M_2G_2I_1$, $M_2G_2I_2$, $M_2G_2I_3$, and $M_2G_2I_4$, the third group of inputs to the four-to-one multiplexer are labeled $M_2G_3I_1$, $M_2G_3I_2$, $M_2G_3I_3$, and $M_2G_3I_4$, and the fourth group of inputs to the four-to-one multiplexer are labeled $M_2G_4I_1$, $M_2G_4I_2$, $M_2G_4I_3$, and $M_2G_4I_4$;

$M_2G_1I_1$ is coupled to the memory cell $B_{1,1}$, $M_2G_1I_2$ is coupled to the memory cell $B_{1,2}$, $M_2GI_{13}$ is coupled to the memory cell $B_{1,3}$, $M_2G_1I_4$ is coupled to the memory cell $B_{1,4}$, $M_2G_2I_1$ is coupled to the memory cell $B_{2,4}$, $M_2G_2I_2$ is coupled to the memory cell $B_{1,1}$, $M_2G_2I_3$ is coupled to the memory cell $B_{1,2}$, $M_2G_2I_4$ is coupled to the memory cell $B_{13}$, $M_2G_3I_1$ is coupled to the memory cell $B_{2,3}$, $M_2G_3I_2$ is coupled to the memory cell $B_{24}$, $M_2G_3I_3$ is coupled to the memory cell $B_{1,1}$, $M_2G_3I_4$ is coupled to the memory cell $B_{1,2}$, $M_2G_4I_1$ is coupled to the memory cell $B_{2,2}$, $M_2G_4I_2$ is coupled to the memory cell $B_{2,3}$, $M_2G_4I_3$ is coupled to the memory cell $B_{2,4}$, and $M_2G_4I_4$ is coupled to the memory cell $B_{1,1}$;

when the first group of four inputs to the four-to-one multiplexer is selected, $M_2G_1I_1$ is coupled to $M_2O_1$, $M_2G_1I_2$ is coupled to $M_2O_2$, $M_2G_1I_3$ is coupled to $M_2O_3$, and $M_2G_1I_4$ is coupled to $M_2O_4$, when the second group of four inputs to the four-to-one multiplexer is selected, $M_2G_2I_1$ is coupled to $M_2O_1$, $M_2G_2I_2$ is coupled to $M_2O_2$, $M_2G_2I_3$ is coupled to $M_2O_3$, and $M_2G_2I_4$ is coupled to $M_2O_4$, when the third group of four inputs to the four-to-one multiplexer is selected, $M_2G_3I_1$ is coupled to $M_2O_1$, $M_2G_3I_2$ is coupled to $M_2O_2$, $M_2G_3I_3$ is coupled to $M_2O_3$, and $M_2G_3I_4$ is coupled to $M_2O_4$, when the fourth group of four inputs to the four-to-one multiplexer is selected, $M_2G_4I_1$ is coupled to $M_2O_1$, $M_2G_4I_2$ is coupled to $M_2O_2$, $M_2G_4I_3$ is coupled to $M_2O_3$, and $M_2G_4I_4$ is coupled to $M_2O_4$; and the four-to-one multiplexer selects the first group of inputs to the four-to-one multiplexer when a third modulo 165 count based on the input based on the first clock counts 0, selects the second group of inputs to the four-to-one multiplexer when the third modulo 165 count based on the input based on the first clock counts 41, selects the third group of inputs to the four-to-one multiplexer when the third modulo 165 count based on the input based on the first clock counts 82, and selects the fourth group of inputs to the four-to-one multiplexer when the third modulo 165 count based on the input based on the first clock counts 123, the third modulo 165 count always in agreement with the first modulo 165 count.

* * * * *